(12) United States Patent
Chen (10) Patent No.: US 9,959,235 B2
(45) Date of Patent: May 1, 2018

(54) INPUT/OUTPUT SWITCHING METHOD, ELECTRONIC DEVICE, AND SYSTEM FOR A SERVER

(71) Applicants: INVENTEC (PUDONG) TECHNOLOGY CORPORATION, Shanghai (CN); INVENTEC CORPORATION, Taipei (TW)

(72) Inventor: Chia-Hsiang Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 169 days.

(21) Appl. No.: 15/086,086

(22) Filed: Mar. 31, 2016

(65) Prior Publication Data

US 2017/0147524 A1    May 25, 2017

(30) Foreign Application Priority Data

Nov. 20, 2015 (CN) .......................... 2015 1 0809980

(51) Int. Cl.
    *G06F 13/40* (2006.01)
(52) U.S. Cl.
    CPC ...... *G06F 13/4027* (2013.01); *G06F 13/4022* (2013.01)
(58) Field of Classification Search
    None
    See application file for complete search history.

(56) References Cited

U.S. PATENT DOCUMENTS

| 6,725,286 B2 * | 4/2004 | Takahashi ............. G11C 5/063 710/11 |
| 8,036,613 B2 * | 10/2011 | Schneckenburger G06F 13/4295 455/146 |
| 8,935,451 B2 * | 1/2015 | Gao .................... G06F 11/2289 710/300 |
| 2007/0101029 A1 * | 5/2007 | Lee ...................... G06F 3/0227 710/72 |
| 2013/0021865 A1 * | 1/2013 | Wu ........................ G11C 5/147 365/226 |
| 2013/0151826 A1 * | 6/2013 | Tu ............................ G06F 1/24 713/1 |
| 2013/0265328 A1 * | 10/2013 | Lambert ............... G06F 11/321 345/629 |

* cited by examiner

*Primary Examiner* — Elias Mamo
(74) *Attorney, Agent, or Firm* — Mark M. Friedman (57) ABSTRACT

An input/output switching system for a server is disclosed herein. The input/output switching system includes a logic-determination device and at least one connector. The at least one connector electrically connects with at least one electronic card. The at least one connector comprises at least one first standard-bus pin group, at least one second standard-bus pin group, and a first distinguishing-signal pin group. The logic-determination device generates a first determination result which is used for determination of type of the at least one electronic card by receiving a distinguishing signal transmitted from the first distinguishing-signal pin group.

2 Claims, 6 Drawing Sheets

INPUT/OUTPUT SWITCHING METHOD, ELECTRONIC DEVICE, AND SYSTEM FOR A SERVER

BACKGROUND OF THE INVENTION

Field of Invention

The present invention relates to the field of server, and in particular to an input/output switching method, electronic device and system for a server.

Description of Prior Art

In the conventional art, a server needs a variety of peripheral cards (P-cards) to meet different desires and system configurations. To connect the P-cards with a baseboard, a variety of electrical connectors are required.

In the design of the connectors, generally, standard connectors are able to connect with standard cards. Those cards which need specially designed connectors are special cards. A special card can be, for example, a combination of two or more standard connectors or specially configured connectors with specific pin designations used to make the special cards operate normally. In general, the special connectors are unable to be used for connecting standard cards.

To expand the versatility of the electrical connector, a method is to add a switch integrated chip (IC) thereon which can determine whether a standard card or a special card is used by detection. However, the addition of the switch IC means additional manufacturing costs.

Hence, it is necessary to provide an input/output switching method, device and system for a server to solve the above technical issue.

SUMMARY OF THE INVENTION

Hence, an objective of the present invention is to provide a server and an input/output switching method to solve the technical issue of the conventional art, by using a logic-determination device of the server itself and/or a baseboard management controller (BMC) to turn on/off a conduction of the at least one standard-bus pin of the connector.

To achieve the above objective, the present invention provides an electronic device, which comprises a logic-determination device and at least one connector.

The at least one connector is used to connect with at least one electronic card. The at least one connector comprises at least one first standard-bus pin, at least one second standard-bus pin, and a first distinguishing-signal pin group. The at least one first standard-bus pin and the at least one second standard-bus pin belong to different bus interface standards. The logic-determination device generates a first determination result which is used for the determination of the type of the at least one electronic card by receiving a first distinguishing signal transmitted from the first distinguishing-signal pin group.

In one preferred embodiment, the logic-determination device further comprises a switch-control module. The switch-control module turns on/off a conduction of the at least one second standard-bus pin of the at least one connector according to the first determination result.

In one preferred embodiment, the logic-determination device further comprises a switch-control module and receives an external switch signal. The switch-control module turns on/off a conduction of the at least one second standard-bus pin of the at least one connector according to the first determination result and the external switch signal.

In one preferred embodiment, the electronic device further comprises a BMC. Each of the at least one connectors further comprises a second distinguishing-signal pin group. The BMC connects with the second distinguishing-signal pin group and generates a second determination result according to a second distinguishing signal transmitted from the second distinguishing-signal pin group. The logic-determination device further comprises a switch-control module and a BMC register. The BMC register is used to receive the second determination result and transmit the second determination result to the switch-control module. The switch-control module turns on/off a conduction of the at least one second standard-bus pin of the at least one connector according to the first determination result and the second determination result.

In one preferred embodiment, the electronic device further comprises a BMC. Each of the at least one connectors further comprises a second distinguishing-signal pin group, the BMC connects with the second distinguishing-signal pin group and generates a second determination result according to a second distinguishing signal transmitted from the second distinguishing-signal pin group. The logic-determination device further comprises a switch-control module and a BMC register. The logic-determination device receives an external signal. The BMC register is used to receive the second determination result and transmit the second determination result to the switch-control module. The switch-control module turns on/off a conduction of the at least one second standard-bus pin of the at least one connector according to the first determination result, the second determination result, and the external signal.

To achieve the above objective, the present invention provides an input/output switching method, which is applied to an electronic device, the input/output switching method comprises:

First, electrically connecting the at least one electronic card by the at least one connector, a first distinguishing-signal pin group of the at least one connector transmitting a first distinguishing signal; then, receiving the first distinguishing signal by a logic-determination device; then, generating a first determination result by the logic-determination device according to the first distinguishing signal, the first determination result is used for determination of type of the at least one electronic card. The at least one connector comprises at least one first standard-bus pin and at least one second standard-bus pin. The at least one first standard-bus pin and the at least one second standard-bus pin belong to different bus interface standards.

In one preferred embodiment, the method further comprises: turning on/off a conduction of the at least one second standard-bus pin of the at least one connector by the logic-determination device, according to the first determination result.

In one preferred embodiment, the method further comprises: receiving an external switch signal by the logic-determination device; finally, turning on/off a conduction of the at least one second standard-bus pin of the at least one connector by a switch-control module of the logic-determination device according to the first determination result and the external switch signal.

In one preferred embodiment, the method further comprises: connecting with the second distinguishing-signal pin group and generating a second determination result by a BMC according to a second distinguishing signal transmitted from the second distinguishing-signal pin group; then, receiving the second determination result and transmitting the second determination result to the switch-control module by a BMC register of the logic-determination device; finally, turning on/off a conduction of the at least one second standard-bus pin of the at least one connector by a switch-control module of the logic-determination device according to the first determination result and the second determination result.

To achieve the above objective, the present invention provides an input/output switching system, which comprises at least one connector, a BMC, and a logic-determination device.

The at least one connector is used to connect with at least one electronic card. And the at least one connector comprises at least one first standard-bus pin, at least one second standard-bus pin, and a first distinguishing-signal pin group. The at least one first standard-bus pin and the at least one second standard-bus pin belong to different bus interface standards.

The BMC is used to connect with the second distinguishing-signal pin group and generates a second determination result according to a second distinguishing signal transmitted from the second distinguishing-signal pin group.

The logic-determination device comprises a switch-control module, a BMC register, and the logic-determination device. The logic-determination device receives an external signal and generates a first determination result which is used for determination of type of the at least one electronic card by receiving a first distinguishing signal transmitted from the first distinguishing-signal pin group. The BMC register is used to receive the second determination result and transmit the second determination result to the switch-control module. The switch-control module turns on/off a conduction of the at least one second standard-bus pin of the at least one connector according to the first determination result, the second determination result, and the external switch signal.

With comparison with the conventional art, the present invention solves the technical issue of the conventional art by using a logic-determination device of the server itself and/or a baseboard management controller (BMC) to turn on/off a conduction of the at least one standard-bus pin of the connector.

DETAILED DESCRIPTION OF THE PREFERRED EMBODIMENTS

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

Figure 1:
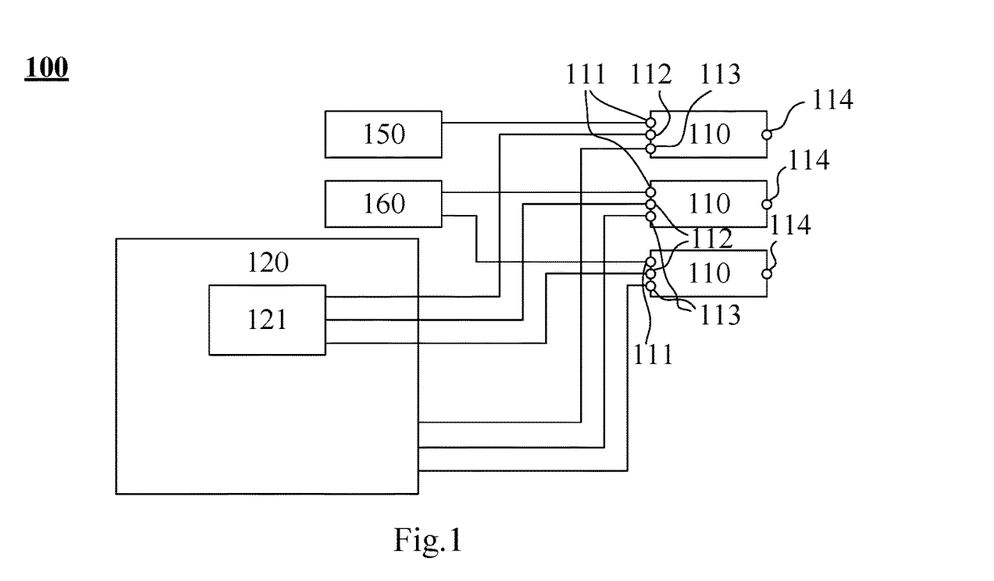
FIG. 1 is a schematic drawing of an input/output switching system of a server according to a first preferred embodiment of the present invention.
Figure 2:
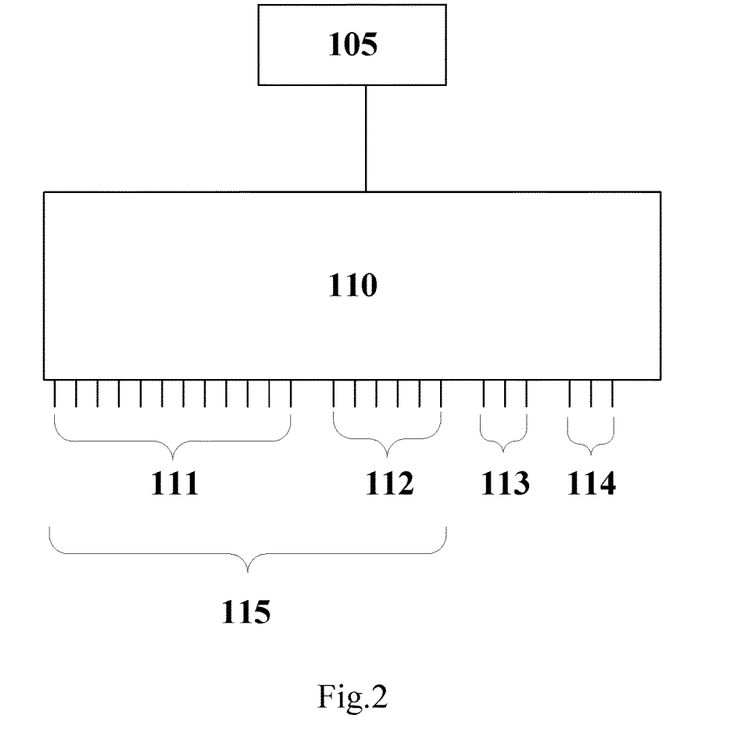
FIG. 2 is a detailed drawing of an electrical connector of the input/output switching system of FIG. 1.

Please refer to FIG. 1 and FIG. 2. FIG. 1 is a schematic drawing of an input/output switching system of a server 100 according to a first preferred embodiment of the present invention. FIG. 2 is a detailed drawing of an electrical connector 110 of the input/output system of the server 100 of FIG. 1. The server 100 comprises a plurality of electrical connectors 110, a logic-determination device 120, a central processor unit (CPU) 150, and a Serial Advanced Technology Attachment (SATA) bus 160.

Each of the plurality of connectors 110 comprises at least one standard-bus pin group 115, a first distinguishing-signal pin group 113, and a second distinguishing-signal pin group 114. The at least one standard-bus pin group 115 comprises at least one first standard-bus pin group 111 and at least one second standard-bus pin group 112. The at least one first standard-bus pin group 111 is used to transmit a basic high speed signal. The at least one first standard-bus pin group 111 and the at least one second standard-bus pin group 112 belong to different bus interface standards. The at least one first standard-bus pin group 111 connects to either the CPU 150 or the SATA bus 160 according to different needs. When the connector 110 is used to connect with a Peripheral Component Interconnect Express (PCI-E), the at least one first standard-bus pin group 111 will connect with the CPU 150; when the connector 110 is used to connect with a Small Computer System Interface (SCSI) such as a Mini SAS (Mini Serial Attached SCSI) or a Mini SAS HD (Mini Serial Attached SCSI High Density), the at least one first standard-bus pin group 111 will connect with the SATA-bus 160. The at least one second standard-bus pin group 112 is used to transmit a logic signal and connect with the logic-determination device 120. When the at least one second standard-bus pin group 112 is off (i.e., not functional), an electronic card 105 in connection with the electrical connector 110 is a standard PCI-E, Mini SAS, or Mini SAS HD electronic card; when the at least one second standard-bus pin group 112 is on (i.e., functional), the electronic card 105 is a special PCI-E, Mini SAS, or Mini SAS HD electronic card. In accordance with the present invention, the at least one second standard-bus pin group 112 is set up to be turned on/off according to different needs. The at least one first distinguishing-signal pin group 113 connects with the logic-determination device 120, to transmit a first distinguishing signal to the logic-determination device 120 for generating a first determination result. Preferably, the logic-determination device 120 is a Complex Programmable Logic Device (CPLD).

The logic-determination device 120 comprises a switch-control module 121. The switch-control module 121 turns on/off a conduction of the at least one second standard-bus pin group 112 of the at least one connector 110, according to the first determination result, in order to determine a type of the connector 110.

Figure 3:
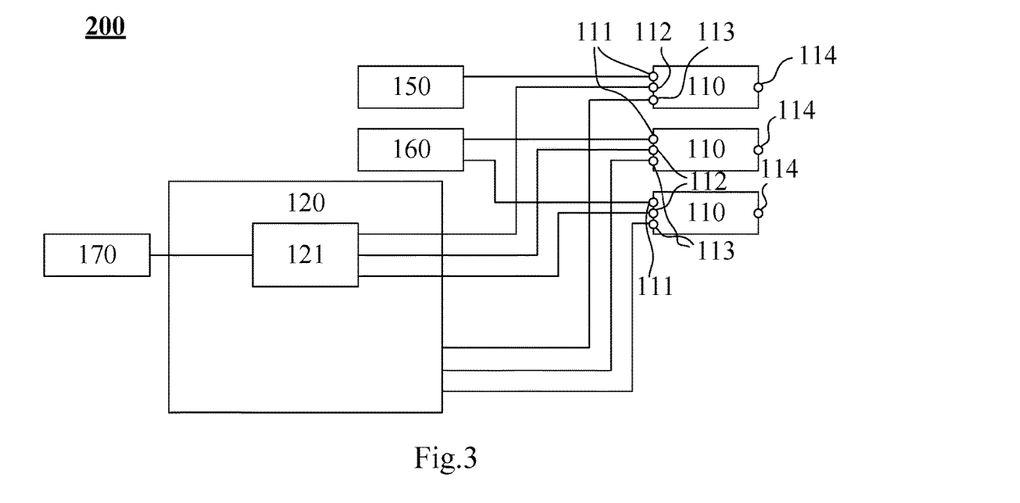
FIG. 3 is a schematic drawing of an input/output switching system of a server according to a second preferred embodiment of the present invention.

FIG. 3 is a schematic drawing of an input/output switching system of a server 200 according to a second preferred embodiment of the present invention. The difference between the second preferred embodiment and the first preferred embodiment is that the logic-determination device 120 further receives an external switch signal 170. Hence, the switch-control module 121 turns on/off a conduction of the at least one second standard-bus pin group 112 of the at least one connector 110, according to the first determination result and the external switch signal 170, in order to determine a type of the connector 110.

Figure 4:
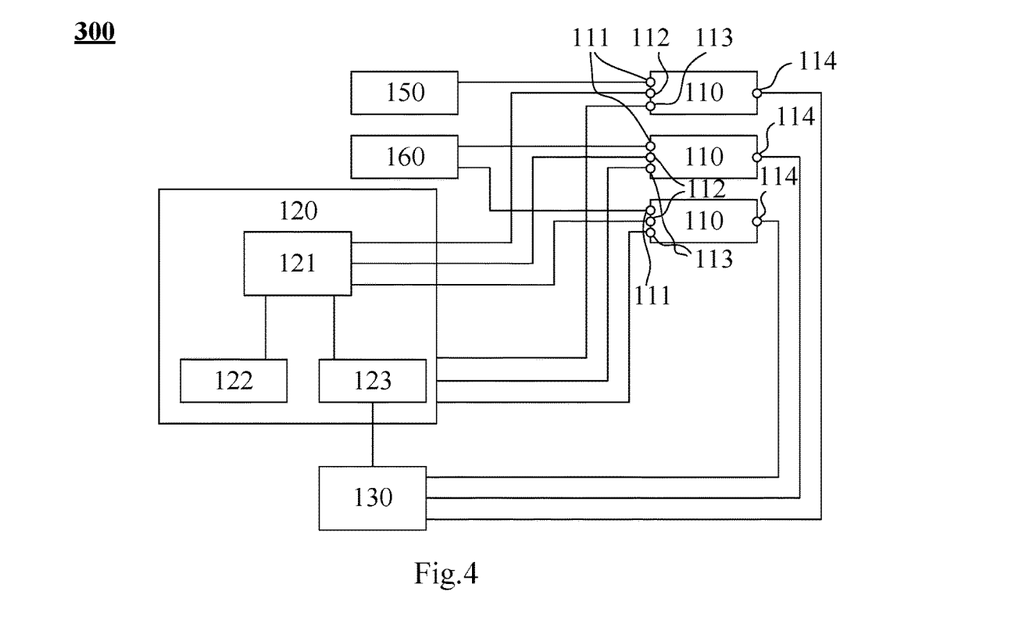
FIG. 4 is a schematic drawing of an input/output switching system of a server according to a third preferred embodiment of the present invention.

FIG. 4 is a schematic drawing of an input/output switching system of a server 300 according to a third preferred embodiment of the present invention. The difference between the third preferred embodiment and the first preferred embodiment is that the logic-determination device 120 further comprises a BMC (Baseboard Management Controller) register 123. The server 300 further comprises a BMC 130. The BMC 130 connects with the second distinguishing-signal pin group 114 and generates a second determination result, according to a second distinguishing signal transmitted from the second distinguishing-signal pin group 114 to the BMC 130. The BMC register 123 is used to receive the second determination result and transmit the second determination result to the switch-control module 121. Hence, the switch-control module 121 turns on/off a conduction of the at least one second standard-bus pin group 112 of the at least one connector 110 according to the first determination result and the second determination result, in order to determine a type of the connector 110.

Figure 5:
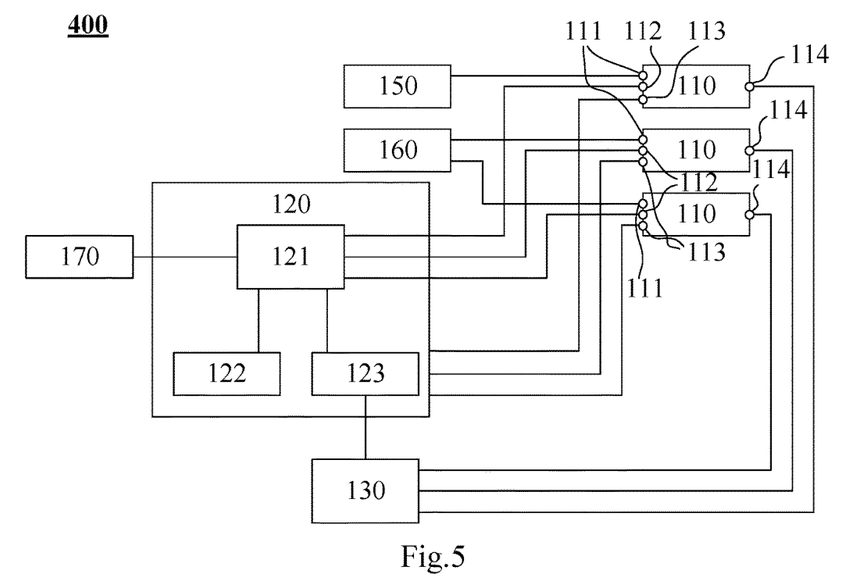
FIG. 5 is a schematic drawing of an input/output switching system of a server according to a fourth preferred embodiment of the present invention.

FIG. 5 is a schematic drawing of an input/output switching system of a server 400 according to a fourth preferred embodiment of the present invention. The difference between the fourth preferred embodiment and the third preferred embodiment is that the logic-determination device 120 further receives an external switch signal 170. Hence, The switch-control module 121 turns on/off a conduction of the at least one second standard-bus pin group 112 of the at least one connector 110 according to the first determination result, the second determination result, and the external signal 170, to determine a type of the connector 110.

Figure 6:
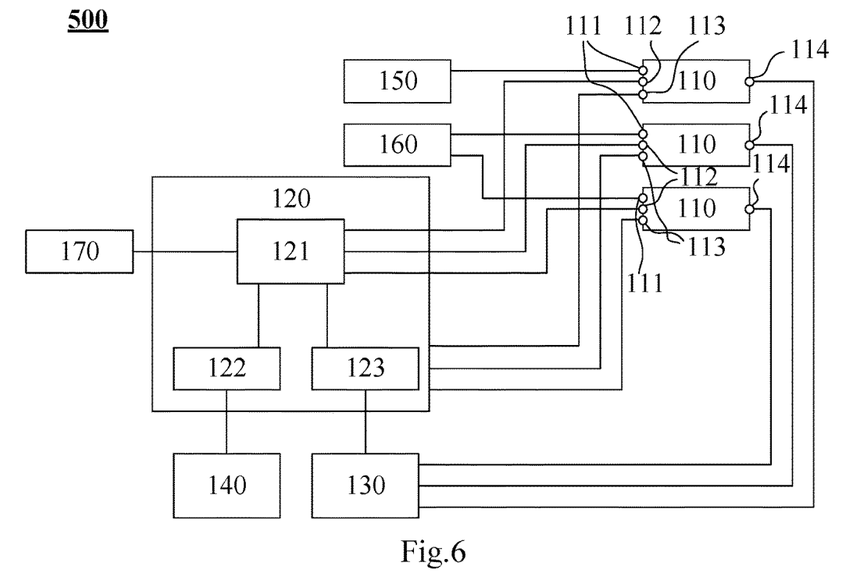
FIG. 6 is a schematic drawing of an input/output switching system of a server according to a fifth preferred embodiment of the present invention.

FIG. 6 is a schematic drawing of an input/output switching system of a server 500 according to a fifth preferred embodiment of the present invention. The difference between the fifth preferred embodiment and the fourth preferred embodiment is that the logic-determination device 120 further comprises a Basic Input/Output System (BIOS) register 122 for receiving an internal switch signal embedded in a BIOS 140. Hence, The switch-control module 121 turns on/off a conduction of the at least one second standard-bus pin group 112 of the at least one connector 110 according to the first determination result, the second determination result, the internal switch signal, and the external signal 170, to determine a type of the connector 110.

Figure 7:
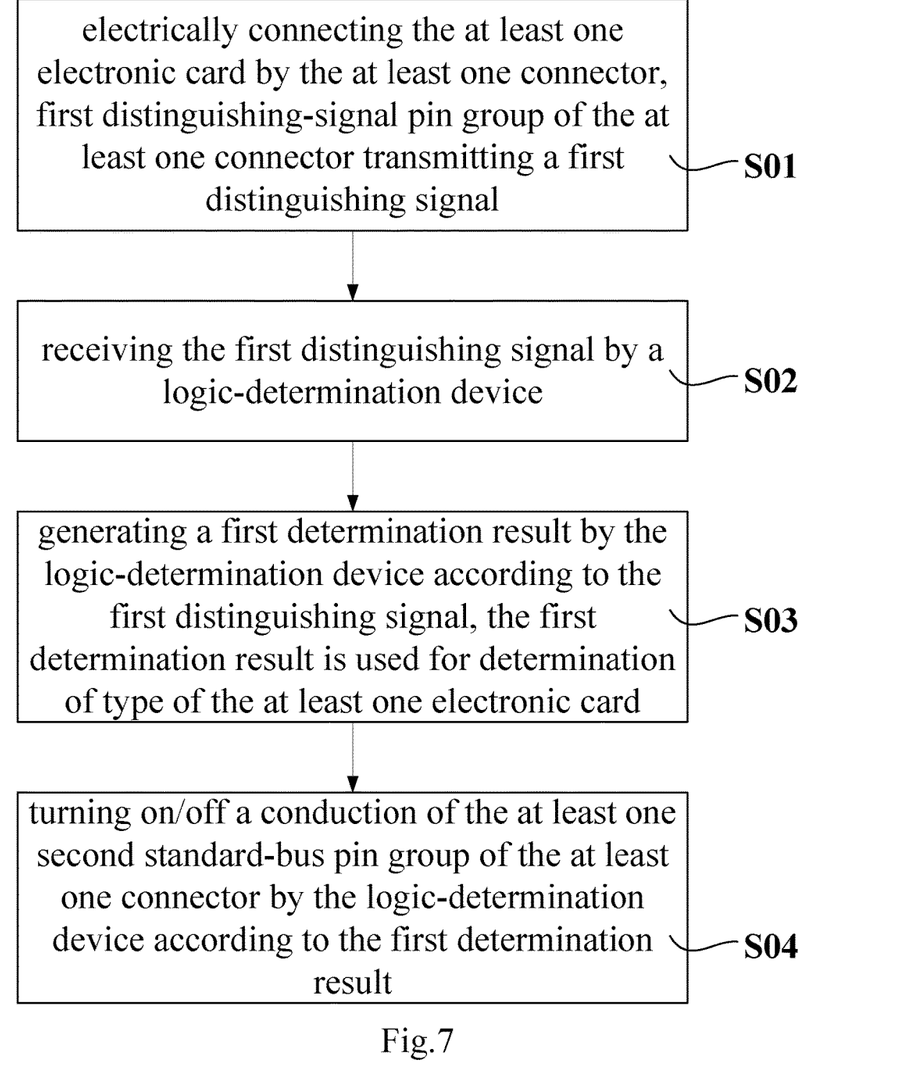
FIG. 7 is a flow diagram of an input/output switching method for a server according to a first preferred embodiment of the present invention.

FIG. 7 is a flow diagram of an input/output switching method of a server 100 according to a first preferred embodiment of the present invention. The numerals of units are referenced to the first preferred embodiment of the system of FIG. 1. The switching method comprises: first, proceeding a step S01, electrically connecting the at least one electronic card 105 by the at least one connector 110, a first distinguishing-signal pin group 113 of the at least one connector 110 transmitting a first distinguishing signal. Then, proceeding a step S02, receiving the first distinguishing signal by a logic-determination device 120. Then, proceeding a step S03, generating a first determination result by the logic-determination device 120 according to the first distinguishing signal, the first determination result is used for the determination of the type of the at least one electronic card 105. Then, proceeding a step S04, turning on/off a conduction of the at least one second standard-bus pin group 112 of the at least one connector 110 by the logic-determination device 120 according to the first determination result.

Figure 8:
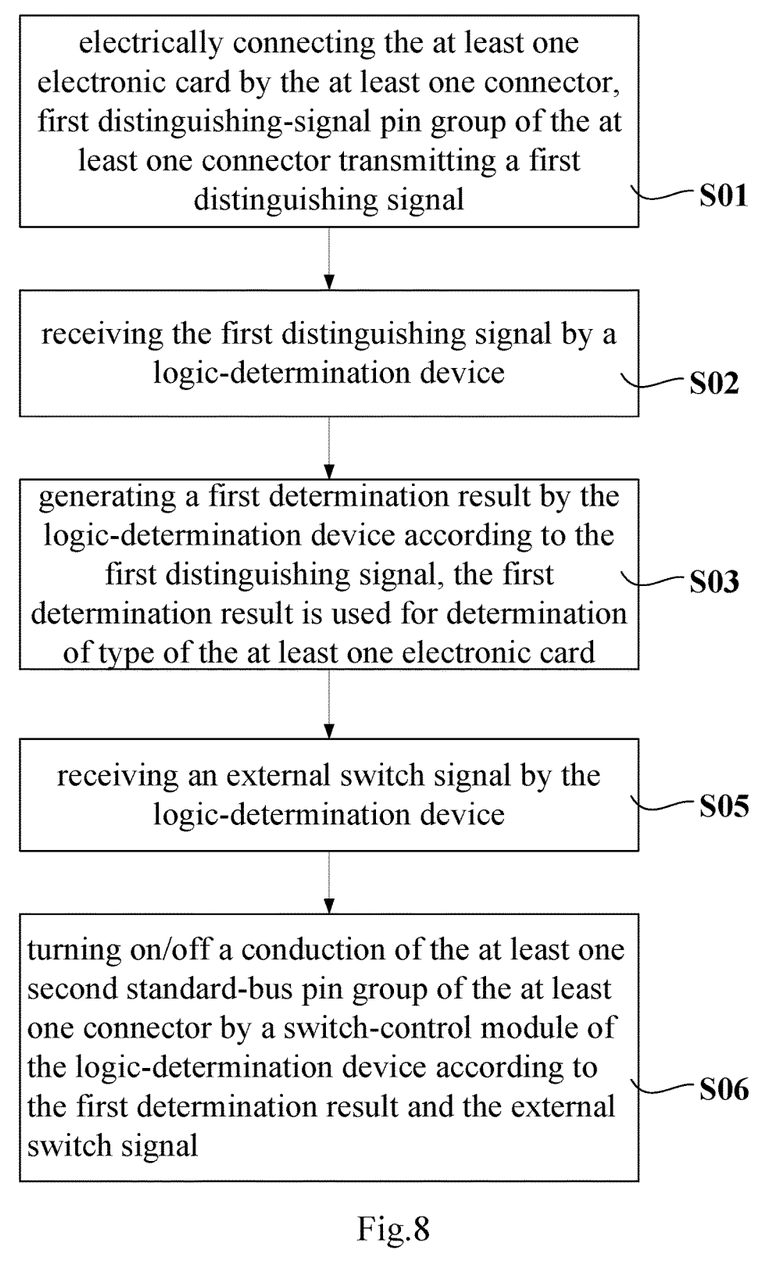
FIG. 8 is a flow diagram of an input/output switching method for a server according to a second preferred embodiment of the present invention.

FIG. 8 is a flow diagram of an input/output switching method of a server 200 according to a second preferred embodiment of the present invention. The numerals of units are referenced to the second preferred embodiment of the system of FIG. 2. The switching method comprises: first, proceeding a step S01, electrically connecting the at least one electronic card 105 by the at least one connector 110, a first distinguishing-signal pin group 113 of the at least one connector 110 transmitting a first distinguishing signal. Then, proceeding a step S02, receiving the first distinguishing signal by a logic-determination device 120. Then, proceeding a step S03, generating a first determination result by the logic-determination device 120 according to the first distinguishing signal, the first determination result is used for determination of type of the at least one electronic card 105. Then, proceeding a step S05, receiving an external switch signal 170 by the logic-determination device 120. Then, proceeding a step S06, turning on/off a conduction of the at least one second standard-bus pin group 112 of the at least one connector 110 by a switch-control module 121 of the logic-determination device 120 according to the first determination result and the external switch signal 170.

Figure 9:
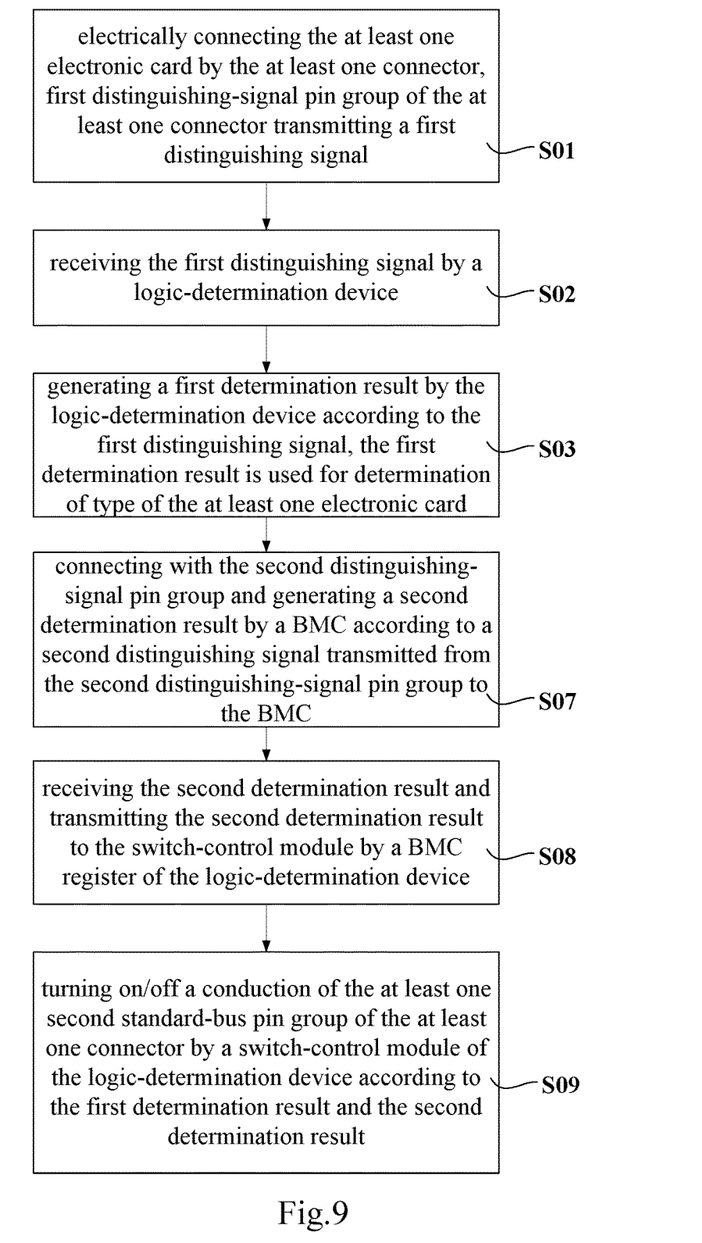
FIG. 9 is a flow diagram of an input/output switching method for a server according to a third preferred embodiment of the present invention.

FIG. 9 is a flow diagram of an input/output switching method of a server 300 according to a third preferred embodiment of the present invention. The numerals of units are referenced to the third preferred embodiment of the system of FIG. 3. The switching method comprises: first, proceeding a step S01, electrically connecting the at least one electronic card 105 by the at least one connector 110, a first distinguishing-signal pin group 113 of the at least one connector 110 transmitting a first distinguishing signal. Then, proceeding a step S02, receiving the first distinguishing signal by a logic-determination device 120. Then, proceeding a step S03, generating a first determination result by the logic-determination device 120 according to the first distinguishing signal, the first determination result is used for determination of type of the at least one electronic card 105. Then, proceeding a step S07, connecting a BMC 130 with the second distinguishing-signal pin group 114 of the at least one connector 110 and generating a second determination result by the BMC 130 according to a second distinguishing signal transmitted from the second distinguishing-signal pin group 114 to the BMC 130. Then, proceeding a step S08, receiving the second determination result and transmitting the second determination result to the switch-control module 121 by a BMC register 123 of the logic-determination device 120. Then, proceeding a step S09, turning on/off a conduction of the at least one second standard-bus pin group 112 of the at least one connector 110 by a switch-control module 121 of the logic-determination device 120 according to the first determination result and the second determination result.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. An input/output switching system, comprising:
   at least one connector, being used to connect with at least one electronic card, and comprising at least one first standard-bus pin group, at least one second standard-bus pin group, a first distinguishing-signal pin group and a second distinguishing-signal pin group, wherein the at least one first standard-bus pin group and the at least one second standard-bus pin group belong to different bus interface standards;
   a BMC, being used to connect with the second distinguishing-signal pin group and generate a second determination result according to a second distinguishing signal transmitted from the second distinguishing-signal pin group to the BMC;
   a logic-determination device, which comprises a switch-control module, a BMC register, and the logic-determination device receives an external signal, the logic-determination device generates a first determination result which is used for determination of type of the at least one electronic card by receiving a first distinguishing signal transmitted from the first distinguishing-signal pin group; the BMC register is used to receive the second determination result and transmit the second determination result to the switch-control module, the switch-control module turns on/off a conduction of the at least one second standard-bus pin group of the at least one connector according to the first determination result, the second determination result and the external switch signal.

2. The input/output switching system according to claim 1 further comprising a Basic Input/Output System (BIOS) register for receiving an internal switch signal embedded in a BIOS, wherein the switch-control module turns on/off a conduction of the at least one second standard-bus pin group of the at least one connector according to the first determination result, the second determination result, the external signal, and the internal switch signal.

* * * * *